United States Patent [19]
Shinomiya et al.

[11] Patent Number: 5,935,393
[45] Date of Patent: Aug. 10, 1999

[54] APPARATUS FOR PRODUCING HYPOCHLORITE

[75] Inventors: Yoshitsugu Shinomiya, Tamano; Koji Miyoshi, Okayama; Shigeki Sudo, Tamano, all of Japan

[73] Assignee: Chlorine Engineers Corp. Ltd., Tokyo, Japan

[21] Appl. No.: 08/920,361

[22] Filed: Aug. 29, 1997

[30] Foreign Application Priority Data

Aug. 29, 1996 [JP] Japan ................................ 8-228545
Aug. 5, 1997 [JP] Japan ................................ 9-210386

[51] Int. Cl.$^6$ .............................. C25B 9/00; C25B 15/08
[52] U.S. Cl. .......................... 204/237; 204/262; 204/263; 204/266
[58] Field of Search ..................... 204/237, 262, 204/263–266, 254–258

[56] References Cited

U.S. PATENT DOCUMENTS 3,390,065   6/1968   Cooper .................................. 205/412
3,539,486  11/1970   Fleck ................................... 204/237 X
3,660,259   5/1972   Danly et al. ......................... 204/237 X

OTHER PUBLICATIONS

Patent Abstracts of Japan, vol. 005, No. 049, Apr. 8, 1981 & JP 56 005303 A (Hitachi Ltd.), Jan. 20, 1981.

*Primary Examiner*—Donald R. Valentine
*Attorney, Agent, or Firm*—Gottlieb, Rackman & Reisman, P.C.

[57] ABSTRACT

The present invention provides an apparatus for producing hypochlorite of any concentration as desired by electrolysis and being easy to maintain. A hypochlorite reaction chamber is provided integrally with an electrolyzer, which is divided by a cation exchange membrane, and introducing means for introducing an anode chamber product and a cathode chamber product is provided between the hypochlorite reaction chamber and the anode chamber or the cathode chamber. As a result, it is possible to obtain an apparatus for producing hypochlorite and being easy to handle, and there is no need to install pipings for chlorine outside the apparatus.

21 Claims, 6 Drawing Sheets

APPARATUS FOR PRODUCING HYPOCHLORITE

BACKGROUND OF THE INVENTION

The present invention relates to an apparatus for producing hypochlorite by electrolysis, and in particular to an apparatus easy to handle and used for producing hypochlorite of high concentration.

Hypochlorite, typically represented by sodium hypochlorite, is widely used as bleaching agent or sterilizer in such applications as processing of city water or sewage water, processing of waste water or for use in kitchen at home or for laundry purpose. There are several methods to produce hypochlorite: a method to produce hypochlorite by making chlorine react with alkali metal hydroxide, which is obtained by electrolysis of aqueous solution of alkali metal chloride such as brine, or a method to electrolyze alkali metal chloride in an electrolyzer without diaphragm and to directly produce hypochlorite in the electrolyzer. By the method to make alkali metal hydroxide react with chlorine, hypochlorite of high concentration can be obtained, and this method is adopted in case hypochlorite is produced for the purpose of sale. Because this method requires electrolysis facility to produce alkali metal hydroxide and chlorine, this is carried out in large scale in association with the production of sodium hydroxide or chlorine at factories operated for electrolysis of brine.

FIG. 11 schematically shows a method to produce hypochlorite by reaction of aqueous solution of sodium hydroxide and chlorine, which are obtained by electrolysis of brine. An anode 22 is provided in an anode chamber 21, and a cathode 24 is provided in a cathode chamber 23. In an ion exchange electrolyzer 26 where the anode chamber and the cathode chamber are separated by a cation exchange membrane 25, brine is supplied to the anode chamber, and brine with lower concentration is taken out from the anode chamber 21, and the dissolved chlorine is separated at a dechlorination tower 27. Then, salt is dissolved in a salt adjusting process 28, and brine is purified and is circulated to the anode chamber.

On the other hand, water 29 is supplied to the cathode chamber 23, and while keeping concentration of aqueous solution of sodium hydroxide in cathode solution at a constant level, it is circulated to and from a cathode solution tank 30. Then, the aqueous solution of sodium hydroxide in the cathode solution tank is reacted with chlorine 32, which is generated in the anode chamber of the electrolyzer at an absorption tower 31. Aqueous solution of sodium hypochlorite is produced, and it is stored in a storage tank 33.

Also, a method is known, by which aqueous solution of salt is electrolyzed in an electrolyzer without diaphragm. By this method, concentration of the hypochlorite produced is relatively low, but the product can be directly used for purification of water or sterilization purposes. The manufacturing facility is simple compared with electrolytic facility to produce alkali hydroxide and chlorine, and this product is produced at the site where hypochlorite is needed. Moreover, in the production of hypochlorite by electrolysis, the production yield can be adjusted by changing electric current depending upon the quantity of hypochlorite. In the product thus obtained, chlorine components effective for sterilization are all dissolved in water, and it is easier to use.

Therefore, in the facilities where chlorine or hypochlorite is used, i.e. the facilities where storage equipment for liquid chlorine is installed and gaseous chlorine generated is dissolved or hypochlorite of high concentration is stored and used by diluting, hypochlorite is produced by electrolysis at the site where there is no need to store or to transport the material such as chlorine.

In case of the method to electrolyze aqueous solution of alkali chloride such as common salt using an electrolyzer without diaphragm, the brine supplied as electrolytic solution has concentration of 2% to 4%. The higher the salt concentration is, the higher the efficiency to generate chlorine at the anode is. When the brine containing hypochlorite produced by electrolysis for processing water or other purposes is directly used as the brine with high concentration, the brine with high concentration is intermingled with the water to be processed and this is not desirable. Accordingly, brine having concentration similar to salt concentration of seawater is normally used. In the electrolysis, hypochlorite is produced by reaction of chlorine generated at anode with alkali generated at cathode. If electrolysis is further continued in the electrolyzer, hypochlorite is changed to chlorate. Therefore, even when it is tried to produce hypochlorite of high concentration in the electrolyzer without diaphragm using brine with relatively low concentration as raw material by extending retention time of electrolytic solution, only the quantity of chlorate increases, and production efficiency of hypochlorite is decreased.

In this respect, in order to produce hypochlorite at high electric current efficiency, an electrolyzer has been proposed, in which a plurality of electrolyzers equipped with anodes and cathodes are provided in multiple stages with dividers installed and without increasing electrolytic efficiency in each unit electrolyzer (e.g. JP-B-52-28104 and JP-B-61-44956). However, the concentration of the hypochlorite obtained by such method is not satisfactory for the application purpose, and there have been strong demands on the development of a method, by which hypochlorite of high concentration can be produced by electrolysis with high efficiency. Under such circumstances, the present applicant has proposed a new method in JP-A-5-179475. According to this method, aqueous solution of alkali metal chloride with lower concentration produced at anode chamber of an electrolyzer divided by cation exchange membrane is added to cathode chamber, and alkali aqueous solution containing hypochlorite is obtained, and this is reacted with chlorine produced at the anode chamber, and aqueous solution of hypochlorite can be obtained. By this method, chlorine is reacted with cathode solution. There is regulatory restriction for safety to chlorine as a specific chemical substance and it must be handled in the same manner as in the chlorine producing facility, and it is necessary to take utmost care to prevent leakage of chlorine from piping of the facility.

It is an object of the present invention to provide an apparatus for producing hypochlorite, by which it is possible to produce hypochlorite of high concentration. According to the present invention, it is possible to produce hypochlorite of the same high concentration as in the case where chlorine and sodium hydroxide obtained by electrolysis in ion exchange electrolyzer of brine are used. Further, it is an object of the invention to provide an apparatus for producing hypochlorite with no possibility of chlorine leakage.

SUMMARY OF THE INVENTION

In the apparatus for producing hypochlorite by electrolysis of brine according to the present invention, a hypochlorite reaction chamber is integrated with an electrolyzer where a cathode chamber and an anode chamber are separated from each other by a cation exchange membrane, and means for introducing at least one of an anode chamber product or a cathode chamber product into the hypochlorite reaction chamber is provided between the hypochlorite reaction chamber and at least one of the anode chamber or the cathode chamber.

The invention also provides an apparatus for producing hypochlorite as described above, wherein there is provided means for separating hydrogen from the cathode chamber product, and the cathode chamber product with hydrogen separated from it is supplied to the hypochlorite reaction chamber or hydrogen separating means is provided to separate hydrogen from the product of the hypochlorite reaction chamber.

The invention further provides an apparatus for producing hypochlorite as described above, wherein the hypochlorite reaction chamber also serves as the anode chamber or the cathode chamber.

The invention also provides an apparatus for producing hypochlorite as described above, wherein a cooling system is provided adjacent to the hypochlorite reaction chamber.

The invention also provides an apparatus for producing hypochlorite as described above, wherein the hypochlorite reaction chamber has an inlet on upper portion and an outlet on lower portion.

The invention further provides an apparatus for producing hypochlorite as described above, wherein there are provided a circulation chamber and a circulating means for hypochlorite, and hypochlorite is circulated between the hypochlorite reaction chamber and the circulating chamber.

The invention also provides an apparatus for producing hypochlorite as described above, wherein a cooling system is arranged in a duct line which connects the hypochlorite reaction chamber with the circulation chamber.

DESCRIPTION OF THE PREFERRED EMBODIMENTS

In the apparatus for producing hypochlorite according to the present invention, a hypochlorite reaction chamber is integrated with an ion exchange electrolyzer where a cathode chamber and an anode chamber are separated from each other by a cation exchange membrane, and without taking chlorine generated in the ion exchange membrane electrolyzer out of the electrolyzer, the chlorine is reacted with aqueous solution of alkali hydroxide generated in the cathode chamber, and hypochlorite is produced.

In the apparatus according to the present invention, a product of the cathode chamber may be directly sent to the hypochlorite reaction chamber or hydrogen not required for production of hypochlorite may be separated from the product in the cathode chamber and may be supplied to the hypochlorite reaction chamber. In any of these two methods, chlorine is not taken out of the electrolyzer, and leakage of the chlorine generated in the anode chamber does not occur due to damage of pipe or other causes does not occur. Therefore, the production facility can be installed at any place and maintenance is also easy to perform.

Because hypochlorite may decompose as temperature increases, a cooling system may be provided adjacent to the hypochlorite reaction chamber or may be arranged between the hypochlorite reaction chamber and the hypochlorite circulation chamber and hypochlorite may be circulated by a circulation pump and cooled.

In the following, description will be given on the present invention referring to the attached drawings.

Figure 1:
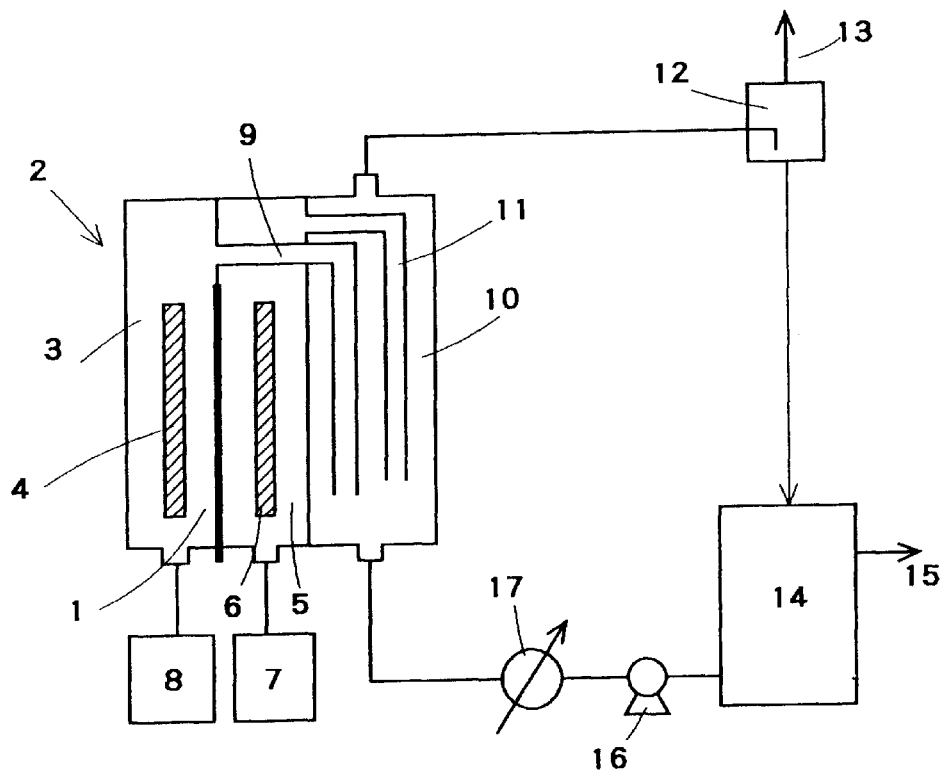
FIG. 1 to FIG. 10 each represents an embodiment of an apparatus according to the present invention.

FIG. 1 shows an embodiment of an apparatus for producing hypochlorite according to the present invention.

In a cathode chamber 3 of an ion exchange electrolyzer 2 divided by a cation exchange membrane 1, a cathode 4 is installed, where nickel, stainless steel or titanium is used or a cathode active substance to decrease hydrogen overvoltage is coated on the metal. In the anode chamber 5, an anode 6 is disposed where coating of an electrode catalyzer containing oxide of a metal of platinum group is formed on a base metal such as titanium. To the anode chamber 5, brine 7 produced by dissolving salt in brine dissolving process is supplied, and water 8 is supplied to the cathode chamber, and while keeping concentration of sodium hydroxide in the cathode solution at a constant level, electrolysis is performed. From the upper portion of the cathode chamber 3, a cathode chamber product containing aqueous solution of sodium hydroxide and hydrogen is supplied to a hypochlorite reaction chamber 10 by cathode chamber product introducing means 9. From the upper potion of the anode chamber 5, an anode chamber product containing brine with decreased salt concentration and chlorine is supplied to the hypochlorite reaction chamber by anode chamber product introducing means 11. In the hypochlorite reaction chamber 10, chlorine reacts with sodium hydroxide, and hypochlorite is generated. In the hypochlorite reaction chamber, agitation and mixing occur due to hydrogen bubbles generated at the cathode chamber. To raise reaction efficiency of chlorine with aqueous solution of sodium hydroxide, a baffle plate may be arranged or a filling material may be filled.

From the aqueous solution of hypochlorite, hydrogen 13 is separated by hydrogen separating means 12 equipped with a water seal safety device, and hypochlorite aqueous solution is introduced into a circulation chamber 14. From the circulation chamber 14, a hypochlorite aqueous solution 15 is taken out as a product, and the hypochlorite aqueous solution is supplied to a cooling system 17 by a circulation pump 16 to cool down temperature of the hypochlorite aqueous solution and to circulate it to the hypochlorite reaction chamber 10. As a result, it is possible to prevent temperature increase in the electrolyzer and to suppress decomposition of the hypochlorite produced.

In the hypochlorite reaction chamber, the following electrolysis occurs:

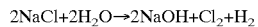

Total quantity of sodium hydroxide and chlorine thus generated reacts as shown by the following reaction equation:

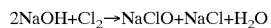

As a result, common salt being equimolar to hypochlorite is generated. On the other hand, the brine supplied to the hypochlorite reaction chamber contains common salt of 60 to 70 g/liter. Aqueous solution of hypochlorite thus produced contains common salt produced by the reaction to generate hypochlorite and common salt in the brine. Therefore, in case it is to be used for the applications where salt concentration becomes an issue, supply quantity of the brine to the anode chamber may be decreased, or content of common salt in the anode chamber may be decreased by raising decomposition ratio of salt or by crystallizing and separating salt from hypochlorite aqueous solution by cooling. The salt crystallized and separated can be dissolved again and used as raw material salt.

According to the apparatus of the present invention, the quantity of water to be supplied to the cathode chamber is adjusted, and it is possible to produce aqueous solution of hypochlorite with any concentration suitable for application purpose.

Also, as the cation exchange membrane of the cation exchange membrane electrolyzer used in the method of the present invention, a cation exchange membrane of fluororesin can be used. Because there is no need to set the concentration of sodium hydroxide aqueous solution generated at cathode to high concentration value, a cation exchange membrane for low concentration can be used.

In the apparatus of the present invention, the brine obtained by dissolving of salt can be directly used when common salt with low impurities is used as raw material. In case the content of impurities is high in the salt or the brine obtained, a brine purification process may be included in the dissolving process of brine.

Figure 2:
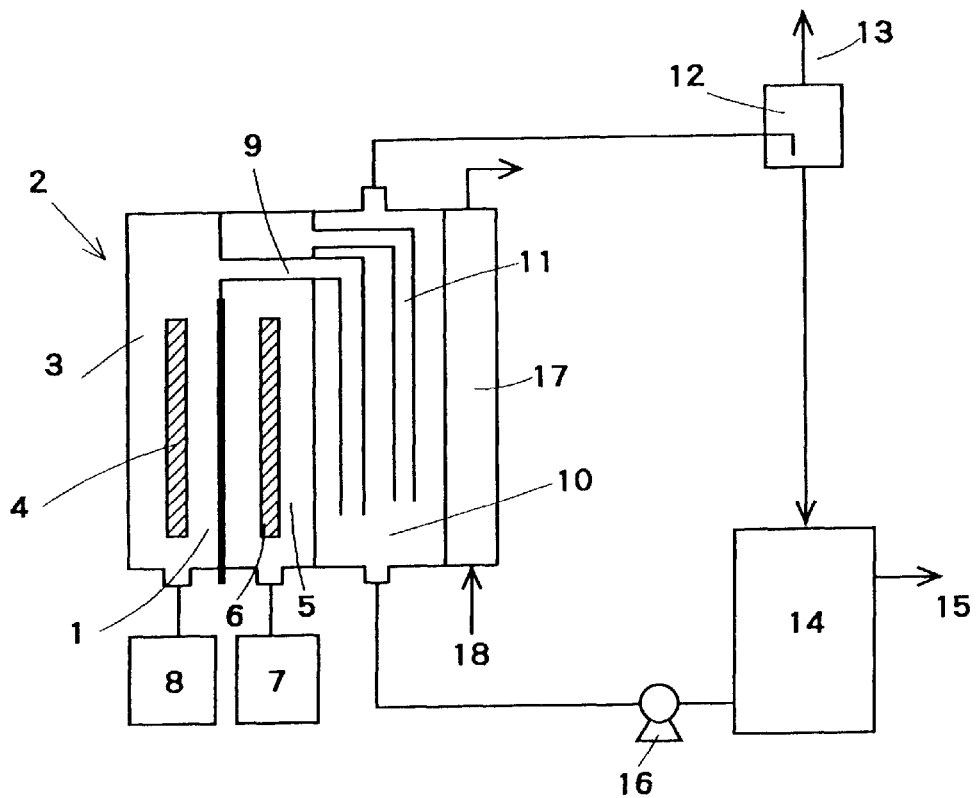

FIG. 2 shows another embodiment of the invention.

The apparatus shown in FIG. 1 comprises a cooling system 17 in the circulating circuit of hypochlorite, while, in the apparatus shown in FIG. 2, a cooling system 17 is arranged adjacent to the hypochlorite reaction chamber 10, and heat generated in the hypochlorite reaction chamber 10 can be eliminated. Thus, there is no need to dispose a cooling system outside the apparatus. In order to increase heat conductive area between the hypochlorite reaction chamber 10 and the cooling system 17 and to raise cooling efficiency, a material with larger surface area may be used as the diaphragm.

Figure 3:
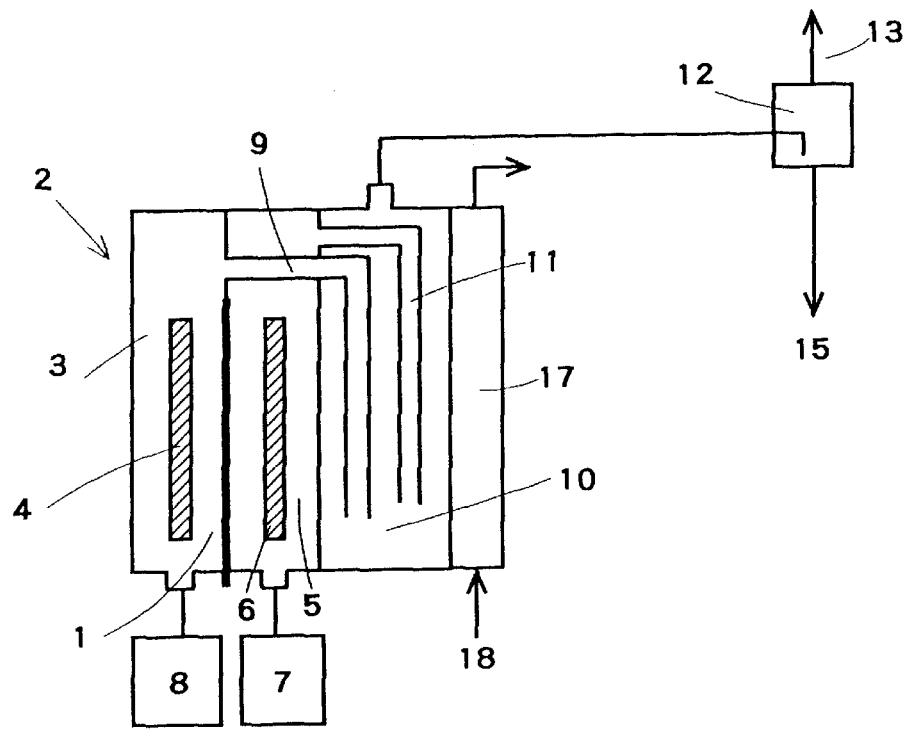

FIG. 3 represents another embodiment of the invention.

Compared with the apparatus shown in FIG. 2, the apparatus of FIG. 3 is suitable for a production apparatus of smaller size. Cooling water 18 is introduced into a cooling system 17, which is provided adjacent to the hypochlorite reaction chamber 10. Hydrogen 13 is separated from the reaction product taken out of the hypochlorite reaction chamber 10 by hydrogen separating means 12, and hypochlorite aqueous solution 15 is obtained. Because there is no circulation system, the structure is simple, and it is suitable for the production apparatus of smaller size.

Figure 4:
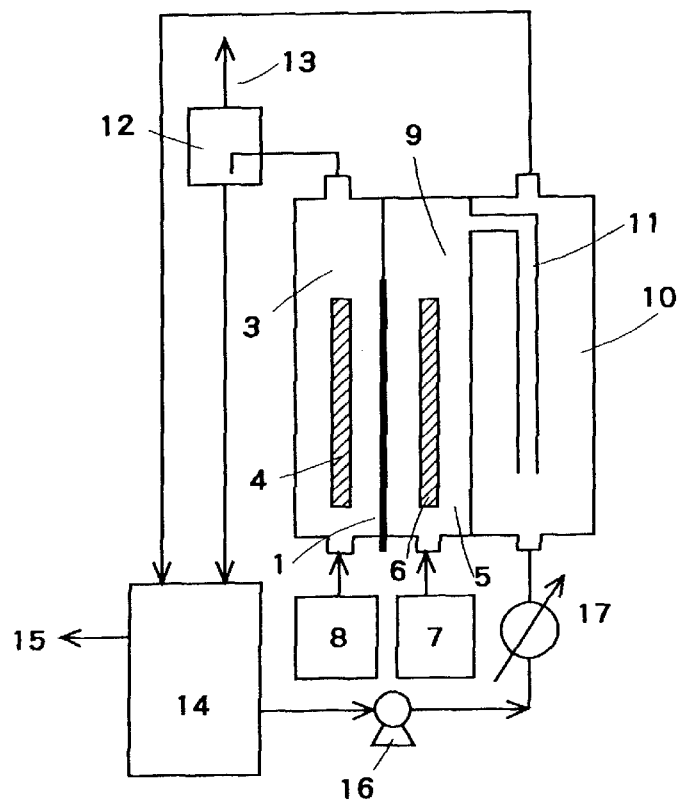

FIG. 4 shows still another embodiment of the invention.

In the apparatus shown in FIG. 4, hydrogen 13 is separated from the cathode chamber product taken out of the cathode chamber 3 using hydrogen separating means 12, and it is supplied to a circulation chamber 14. Then, it is sent from the circulation chamber 14 to the cooling system 17 using a circulation pump 16. Further, it is supplied to the hypochlorite reaction chamber 10 and reacted with the anode chamber product sent by the anode chamber product introducing means 11. Then, the reaction product is sent to the circulation chamber 14, and hypochlorite aqueous solution 15 is obtained.

Figure 5:
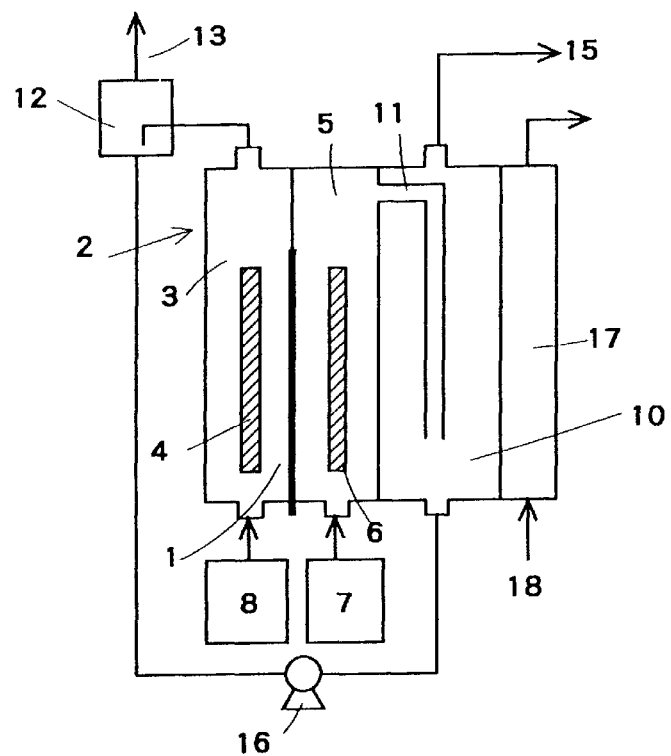

The apparatus shown in FIG. 5 is the same as the apparatus of FIG. 4, except that the cooling system 17 is provided not in the circulation line of the hypochlorite aqueous solution, but it is arranged adjacent to the hypochlorite reaction chamber 10, and cooling water 18 is supplied to cool the hypochlorite reaction chamber 10.

Figure 6:
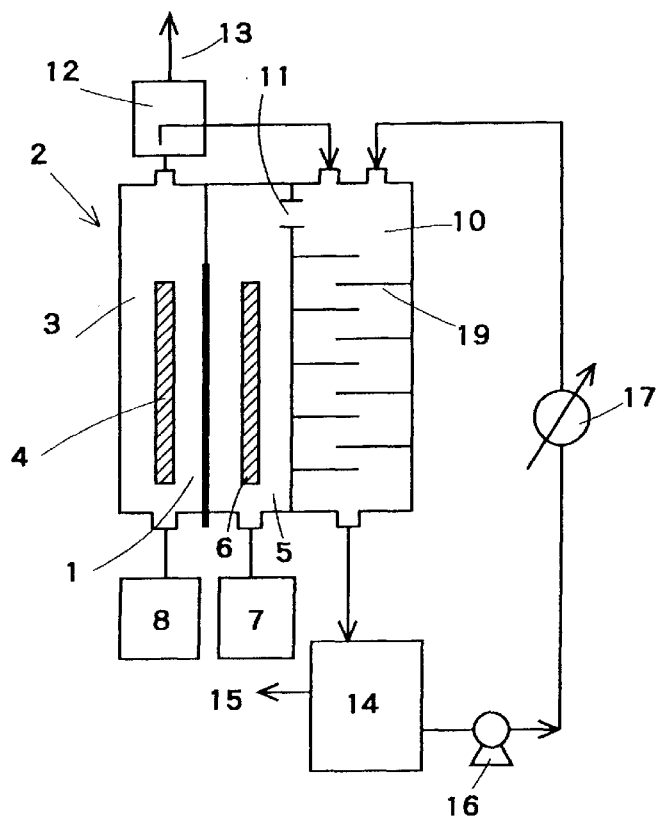

FIG. 6 shows another embodiment of the invention.

In the apparatus shown in FIG. 6, hydrogen 13 is separated from the cathode chamber product taken out of the cathode chamber 3 using hydrogen separating means 12, and it is then sent into the hypochlorite reaction chamber 10 from above, and an anode chamber product is also supplied by anode chamber product introducing means 11. In the hypochlorite reaction chamber 10, a baffle plate 19 is disposed. Reaction occurs while the product flows downwards from above, and it is sent into the circulation chamber 14. The hypochlorite aqueous solution is taken out of the circulation chamber 14. It is sent to the cooling system 17 from the circulation chamber 14 using the circulation pump 16, and it is circulated to the hypochlorite reaction chamber 10. A baffle plate is arranged in the hypochlorite reaction chamber 10, and the solution cooled down by the cooling system 17 is supplied, and this makes it possible to promote reaction of hypochlorite and to raise cooling efficiency.

Figure 7:
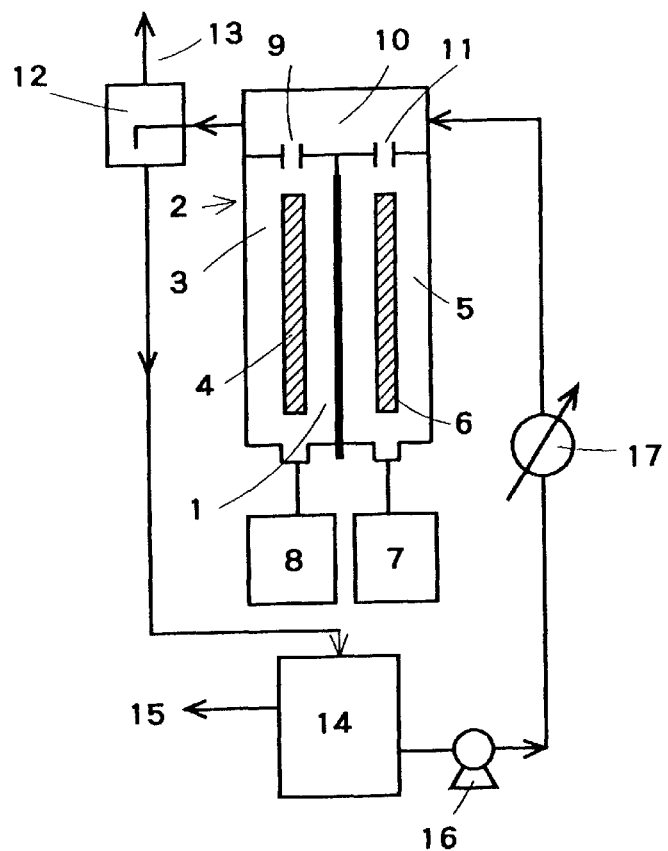

FIG. 7 represents still another embodiment of the invention.

A hypochlorite reaction chamber 10 is provided above an ion exchange electrolyzer 2, and a cathode chamber product and an anode chamber product are supplied by cathode chamber product introducing means 9 and anode chamber product introducing means 11 respectively, and these are reacted with each other. After hydrogen 13 is separated by hydrogen separating means 12, the reaction product is sent to the circulation chamber 14. Then, it is cooled by the cooling system 17 using the circulation pump 16, and it is circulated to the hypochlorite reaction chamber 10. In this apparatus, the hypochlorite reaction chamber is arranged above the cathode chamber and the anode chamber of the electrolyzer. As a result, it is possible to design the apparatus in compact size, and this is suitable for the case where installation space for the apparatus is limited.

Figure 8:
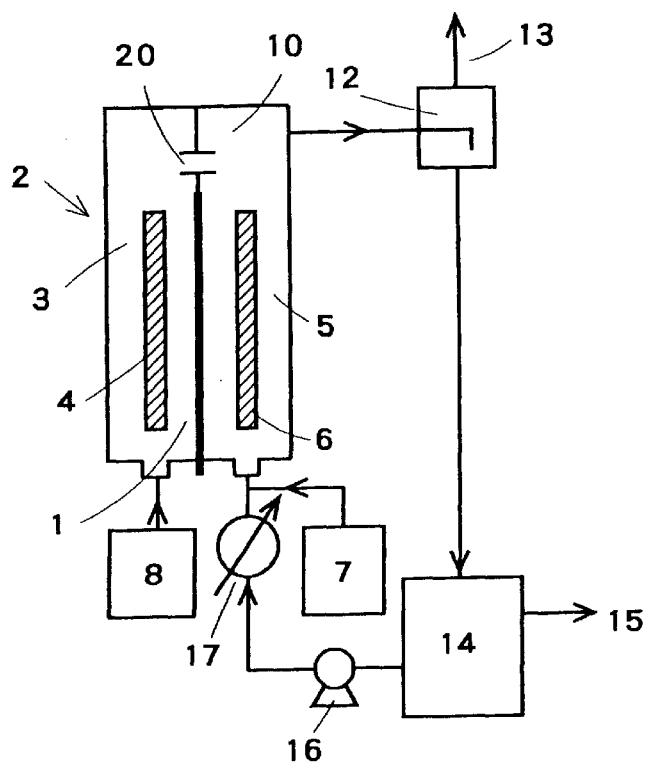

FIG. 8 represents another embodiment of the present invention, and it is an apparatus suitable for production of hypochlorite with relatively low concentration.

In the apparatus of FIG. 8, an upper portion of the anode chamber 5 is designed as a hypochlorite reaction chamber 10. A through-hole 20 is formed on partition wall between upper portions of the cathode chamber and the anode chamber. Flow rates of the water 8 to be supplied to the cathode chamber 3, of the brine 7 to be supplied to the anode chamber 5, and of the hypochlorite aqueous solution to be circulated are adjusted so that the cathode chamber product passes through the through-hole 20 and is sent to the upper portion of the anode chamber 5. In the upper portion of the anode chamber, sodium hydroxide aqueous solution coming from the cathode chamber reacts with chlorine generated in the anode chamber. After it is sent to the hydrogen separating means 12 and hydrogen is separated, it is sent to the circulation chamber 14, and hypochlorite aqueous solution 15 is taken out of the circulation chamber 14.

Figure 9:
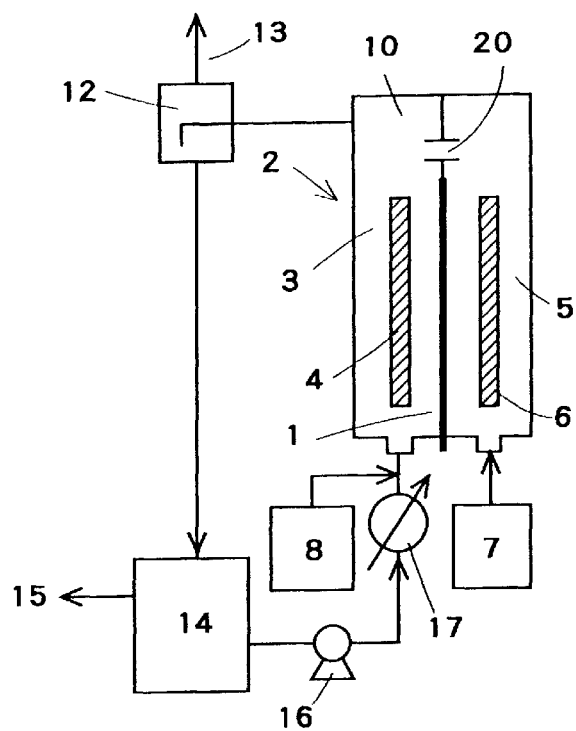

FIG. 9 shows another embodiment of the present invention. An upper portion of the anode chamber 5 is designed as a hypochlorite reaction chamber in the apparatus of FIG. 8, while, in the apparatus of FIG. 9, an upper portion of the cathode chamber 3 is designed as a hypochlorite reaction chamber. A through-hole 20 is formed on partition wall between upper portions of the cathode chamber and the anode chamber. Flow rates of the brine 7 to be supplied to the anode chamber 5, of the water 8 to be supplied to the cathode chamber 3, and of the hypochlorite aqueous solution to be circulated are adjusted so that the anode chamber product passes through the through-hole 20 and flows into the upper portion of the cathode chamber 3. The sodium hydroxide generated at the cathode chamber 3 reacts with chlorine from the anode chamber, and hypochlorite is produced. After hydrogen is separated by the hydrogen separating means 12, the hypochlorite aqueous solution is sent to the circulation chamber 14, and hypochlorite aqueous solution 15 is taken out of the circulation chamber 14, and it is cooled down by the circulation pump 16 and the cooling system 17 and is circulated to the cathode chamber. Similarly to the apparatus of FIG. 8, this apparatus is also suitable for the case where hypochlorite with relatively low concentration is needed. Because a part of the cathode chamber is designed as a reaction chamber, the generated hypochlorite may be reduced on the surface of the cathode, and electric current efficiency may be decreased compared with the case of FIG. 8 where a part of the anode chamber is designed as a hypochlorite reaction chamber. However, it can be satisfactorily used in case of small size apparatus where electric current efficiency is not an important issue. If a cathode capable to suppress the reduction of hypochlorite is used, it is possible to improve electric current efficiency.

Figure 10:
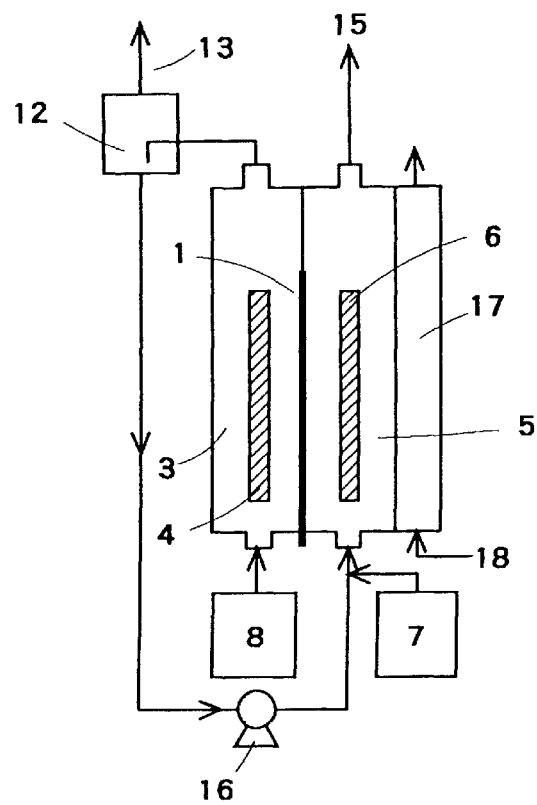
Figure 11:
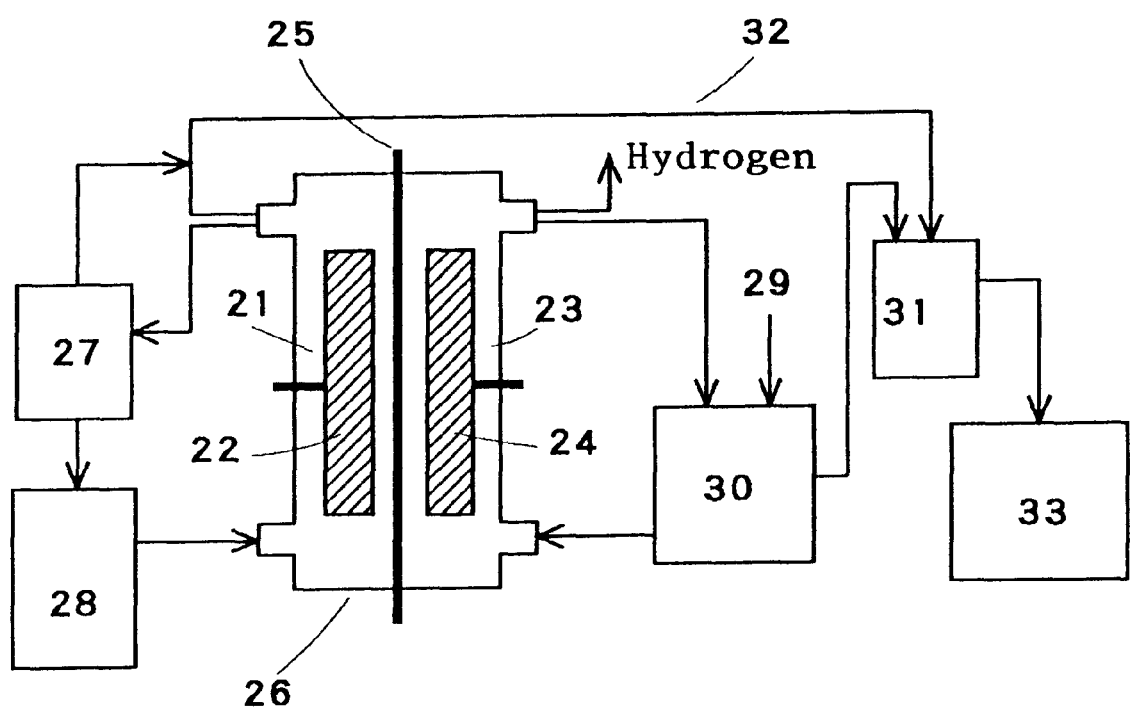
FIG. 11 is a drawing to explain a conventional method for producing hypochlorite using an ion exchange membrane electrolyzer.

FIG. 10 shows another embodiment of the invention, and it is an apparatus suitable for production of hypochlorite with relatively low concentration as in the apparatuses of FIG. 8 and FIG. 9. A cathode chamber product is taken out of the cathode chamber 3 and hydrogen 13 is separated by hydrogen separating means 12. Then, it is sent to the anode chamber 5 together with the brine 7 using the circulation pump 16. The anode chamber 5 is used as the hypochlorite reaction chamber, and hypochlorite aqueous solution 15 is obtained from the anode chamber. The cooling system is provided adjacent to the anode chamber 5, which also serves as the hypochlorite reaction chamber, and the product is cooled down with the cooling water 18 to prevent decomposition of the hypochlorite.

As described above, there are a wide variety of embodiments of the apparatus for producing hypochlorite of the present invention, and an adequate type of apparatus can be selected depending upon concentration of the hypochlorite to be needed.

In the following, description will be given on an example to explain the present invention.

EXAMPLE 1

There were provided an anode chamber with an anode, coated with an electrode catalyzer containing oxide of metal of platinum group (300 mm in length; 165 mm in width), and a cathode chamber equipped with a titanium cathode, and a hypochlorite reaction chamber of 14 mm in thickness was integrated with an electrolyzer on opposite side of the anode chamber to the cathode chamber. Using a cation exchange membrane of fluoro-resin type (Dupont; Nafion 324), the anode chamber was separated from the cathode chamber, and an electrolyzer was assembled. From upper positions of the anode chamber and the cathode chamber, introducing means each having diameter of 10 mm were connected to the hypochlorite reaction chamber. When electric current of 100 A was connected to the electrolyzer, chamber voltage was 4 V. To the anode chamber, brine of 300 g/liter was supplied at flow rate of 1 liter/hour, and water was added to the cathode chamber at a rate of 1.1 liters/hour. As a result, hypochlorite aqueous solution of 58 g/liter was obtained at a rate of 2.1 liters/hour. Electric current efficiency in the production of hypochlorite was 92%. In this case, circulating quantity of the hypochlorite aqueous solution was 40 liters/hour. Temperature of the electrolyzer was maintained at 26° C. using a cooling system.

When the same operation as above was performed except that the adding quantity of the water to the cathode chamber was set to 3 liters/hour, hypochlorite aqueous solution of 32 g/liter was obtained. When adding quantity of water was set to 0.5 liter/hour, hypochlorite aqueous solution of 95 g/liter was obtained.

As described above, in the apparatus to produce hypochlorite of the present invention, a hypochlorite reaction chamber is provided integrally with an electrolyzer of alkali metal chloride aqueous solution using a cation exchange membrane, and total quantity of the products of the anode chamber and the cathode chamber of the electrolyzer is supplied to the hypochlorite reaction chamber. As a result, total quantity of chlorine generated at the anode chamber and sodium hydroxide generated at the cathode chamber can be used for reaction. Further, there is no possibility of leakage of chlorine to outside from piping, and it is possible to obtain an apparatus to produce hypochlorite aqueous solution with any concentration, i.e. from low concentration to high concentration, and the apparatus is easy to maintain. Accordingly, hypochlorite with high concentration can be easily produced directly at the site where hypochlorite is to be used.

What we claim are:

1. An apparatus for producing hypochlorite by electrolysis of brine comprising:
    an electrolyzer receiving brine, said electrolyzer comprising a cathode chamber and an anode chamber separated from each other by a cation exchange membrane and producing a cathode chamber product and an anode chamber product, respectively, a hypochlorite reaction chamber integrally installed within said electrolyzer, and introducing means for introducing at least one of said anode chamber product and said cathode chamber product into said hypochlorite reaction chamber; said hypochlorite reaction chamber being arranged and constructed to react said cathode chamber product and said anode chamber product to produce hypochlorite.

2. An apparatus for producing hypochlorite according to claim 1 further comprising hydrogen separating means for separating hydrogen from said cathode chamber product resulting in a modified product, and means for supplying said modified product to said hypochlorite reaction chamber.

3. An apparatus for producing hypochlorite according to claim 2 further comprising a cooling system arranged adjacent to said hypochlorite reaction chamber.

4. An apparatus for producing hypochlorite according to claim 3 further comprising a circulation chamber and circulating means for circulating hypochlorite produced in said hypochlorite reaction chamber circulating between said hypochlorite reaction chamber and said circulation chamber.

5. The apparatus for producing hypochlorite in accordance with claim 2 wherein said hypochlorite reaction chamber is arranged and constructed to define one of said cathode chamber and said anode chamber and wherein said introducing means is coupled between said hypochlorite reaction chamber and the other of said cathode chamber and said anode chamber.

6. An apparatus for producing hypochlorite according to claim 5 further comprising a cooling system arranged adjacent to said hypochlorite reaction chamber.

7. An apparatus for producing hypochlorite according to claim 6, further comprising a circulation chamber and circulating means for circulating hypochlorite produced in said hypochlorite reaction chamber circulating between said hypochlorite reaction chamber and said circulation chamber.

8. An apparatus for producing hypochlorite according to claim 2, a further comprising a circulation chamber and circulating means for circulating hypochlorite produced in said hypochlorite reaction chamber between said hypochlorite reaction chamber and said circulation chamber.

9. An apparatus for producing hypochlorite according to claim 8 further comprising a cooling system including a duct line which connects said hypochlorite reaction chamber with the said circulation chamber.

10. An apparatus for producing hypochlorite according to claim 5 further comprising a circulation chamber and circulating means for circulating hypochlorite produced in said hypochlorite reaction chamber circulating between said hypochlorite reaction chamber and said circulation chamber.

11. An apparatus for producing hypochlorite according to claim 10 further comprising a cooling system including a duct line which connects said hypochlorite reaction chamber with the said circulation chamber.

12. An apparatus for producing hypochlorite according to claim 1, further comprising a cooling system arranged adjacent to said hypochlorite reaction chamber.

13. An apparatus for producing hypochlorite according to claim 12 further comprising a circulation chamber and circulating means for circulating hypochlorite produced in said hypochlorite reaction chamber circulating between said hypochlorite reaction chamber and said circulation chamber.

14. An apparatus for producing hypochlorite according to claim 1, further comprising a circulation chamber and circulating means for circulating hypochlorite produced in said hypochlorite reaction chamber between said hypochlorite reaction chamber and said circulation chamber.

15. An apparatus for producing hypochlorite according to claim 14 further comprising a cooling system including a duct line which connects said hypochlorite reaction chamber with the said circulation chamber.

16. An apparatus for producing hypochlorite according to claim 1, wherein said hypochlorite reaction chamber is adapted to produce a reaction product, further comprising hydrogen separating means coupled to said hydrogen reaction chamber and arranged to separate hydrogen from said reaction product.

17. The apparatus for producing hypochlorite in accordance with claim 1 wherein said hypochlorite reaction chamber is arranged and constructed to define one of said cathode chamber and said anode chamber and wherein said introducing means is coupled between said hypochlorite reaction chamber and the other of said cathode chamber and said anode chamber.

18. An apparatus for producing hypochlorite according to claim 17 further comprising a cooling system arranged adjacent to said hypochlorite reaction chamber.

19. An apparatus for producing hypochlorite according to claim 18 further comprising a circulation chamber and circulating means for circulating hypochlorite produced in said hypochlorite reaction chamber circulating between said hypochlorite reaction chamber and said circulation chamber.

20. An apparatus for producing hypochlorite according to claim 17 further comprising a circulation chamber and circulating means for circulating hypochlorite produced in said hypochlorite reaction chamber between said hypochlorite reaction chamber and said circulation chamber.

21. An apparatus for producing hypochlorite according to claim 20, further comprising a cooling system including a duct line which connects said hypochlorite reaction chamber with the said circulation chamber.

\* \* \* \* \*